US008072787B2

(12) United States Patent
Yang et al.

(10) Patent No.: US 8,072,787 B2
(45) Date of Patent: Dec. 6, 2011

(54) SYNCHRONOUS RECTIFYING FOR SOFT SWITCHING POWER CONVERTERS

(75) Inventors: Ta-Yung Yang, Milpitas, CA (US);
Wei-Li Hsu, Keelung (TW);
Chou-Sheng Wang, Keelung (TW)

(73) Assignee: System General Corporation, Shin-Dian, Taipei (TW)

( * ) Notice: Subject to any disclaimer, the term of this patent is extended or adjusted under 35 U.S.C. 154(b) by 449 days.

(21) Appl. No.: 11/924,761

(22) Filed: Oct. 26, 2007

(65) Prior Publication Data

US 2009/0109715 A1    Apr. 30, 2009

(51) Int. Cl.
*H02M 7/217* (2006.01)
(52) U.S. Cl. .................. 363/127; 363/21.06; 363/21.14
(58) Field of Classification Search ............... 363/21.06, 363/21.14, 127
See application file for complete search history.

(56) References Cited

U.S. PATENT DOCUMENTS

| 5,774,350 A | 6/1998 | Notaro et al. | |
| 2006/0072349 A1* | 4/2006 | Lin | 363/21.06 |
| 2007/0263421 A1* | 11/2007 | Kyono | 363/127 |
| 2008/0043504 A1* | 2/2008 | Ye et al. | 363/97 |

OTHER PUBLICATIONS

CN Office Action mailed Apr. 2, 2010.

* cited by examiner

*Primary Examiner* — Harry Behm
*Assistant Examiner* — Matthew Grubb
(74) *Attorney, Agent, or Firm* — Thomas|Kayden (57) ABSTRACT

An synchronous rectifying apparatus or synchronous rectifying circuit of a soft switching power converter is provided to improve the efficiency. The integrated synchronous rectifying circuit includes: a power transistor connected from a transformer to the output of the power converter for rectifying; a controller having a latch circuit generates a drive signal to control the power transistor in response to a switching signal generated by a winding of the transformer in response to the switching of the transformer. The controller turns off the power transistor when the switching signal is lower than a low-threshold. The power transistor is turned on when the switching signal is higher than a high-threshold. Furthermore, a maximum-on-time circuit provided in the controller is applied to generate a maximum-on-time signal for limiting the maximum on time of the power transistor.

10 Claims, 8 Drawing Sheets

SYNCHRONOUS RECTIFYING FOR SOFT SWITCHING POWER CONVERTERS

BACKGROUND OF THE INVENTION

1. Field of Invention

The present invention relates to power converters, and more particularly, relates to synchronous rectifying for soft switching power converters.

2. Description of Prior Art

Figure 1:
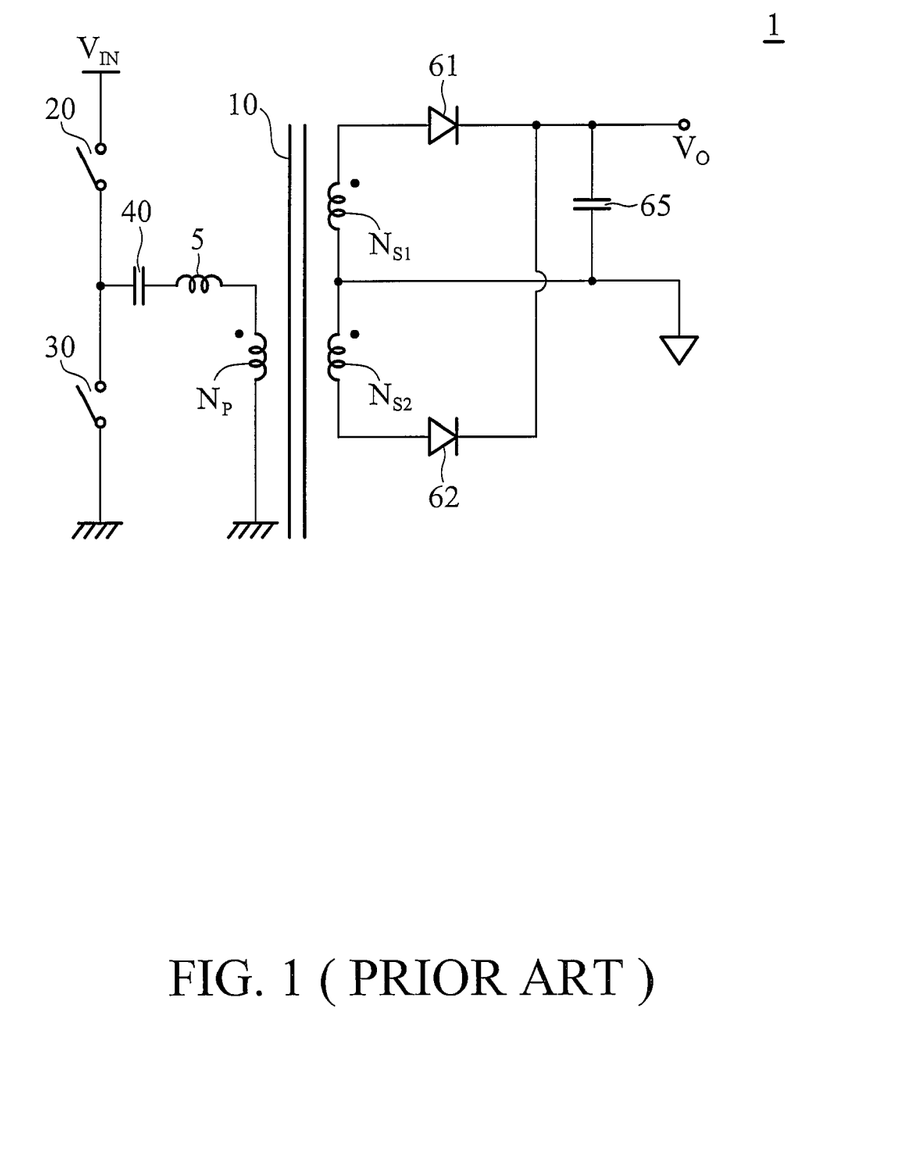
FIG. 1 shows a circuit schematic of a conventional soft switching power converter.

FIG. 1 shows a circuit schematic of a conventional soft switching power converter 1. It includes a transformer 10 to provide isolation from line input $V_{IN}$ to the output $V_O$ of the power converter 1 for safety. Switches 20 and 30 develop a half bridge circuit to switch a resonant tank and the transformer 10. An inductor 5 and a capacitor 40 form the resonant tank. The inductor 5 can be an inductance device or the leakage inductance of a primary winding $N_P$ of the transformer 10. The inductance L of the inductor 5 and the capacitance C of the capacitor 40 determine the resonance frequency $f_0$ of the resonant tank.

$$f_0 = \frac{1}{2\pi\sqrt{L \times C}} \quad (1)$$

The transformer 10 transfers the energy from the primary winding $N_P$ to the secondary windings $N_{S1}$, $N_{S2}$ of the transformer 10. Rectifiers 61, 62 and a capacitor 65 rectify and filter voltages at the secondary windings $N_{S1}$, $N_{S2}$ to generate a DC voltage $V_O$ at the output of the power converter 1. The detail operation and description of the soft switching power converter 1 can be found in text book "Resonant Power Converters" by Marian K. Kazimierczuk and Dariusz Czarkowski, 1995 by John Wiley & Sons, Inc.

Although the soft switching of the power converter can achieve high efficiency and low EMI (electric-magnetic interference) performance, the forward voltage of rectifiers 61 and 62 still causes significant power losses. Using transistors as the synchronous rectifiers is a higher efficiency approach, such as "Control circuit associated with saturable inductor operated as synchronous rectifier forward power converter" disclosed by Yang, in U.S. Pat. No. 7,173,835. However, the disadvantage of this prior art is an additional power consumptions caused by saturable inductors, etc. Besides, it is not optimized for soft-switching topologies. The object of present invention is to provide the synchronous rectifying for soft switching power converter to achieve higher efficiency.

BRIEF SUMMARY OF THE INVENTION

A synchronous rectifying apparatus or circuit for a soft switching power converter includes: a power transistor and a diode connected from a transformer to the output of the power converter for the rectifying; a controller, having a latch circuit, for generating a drive signal to control the power transistor in response to a switching signal which is generated by a winding of the transformer and responsive to the switching of the transformer. The switching signal is correlated to the zero-crossings of the switching current of the transformer. The controller is developed to turn off the power transistor when the switching signal is lower than a low-threshold or the diode is reversely biased. The power transistor is turned on when the switching signal is higher than a high-threshold and the diode is forward biased. The level of the high-threshold is higher than the level of the low-threshold. Furthermore, a maximum-on-time circuit of the controller is utilized to limit the maximum on time of the power transistor.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 2:
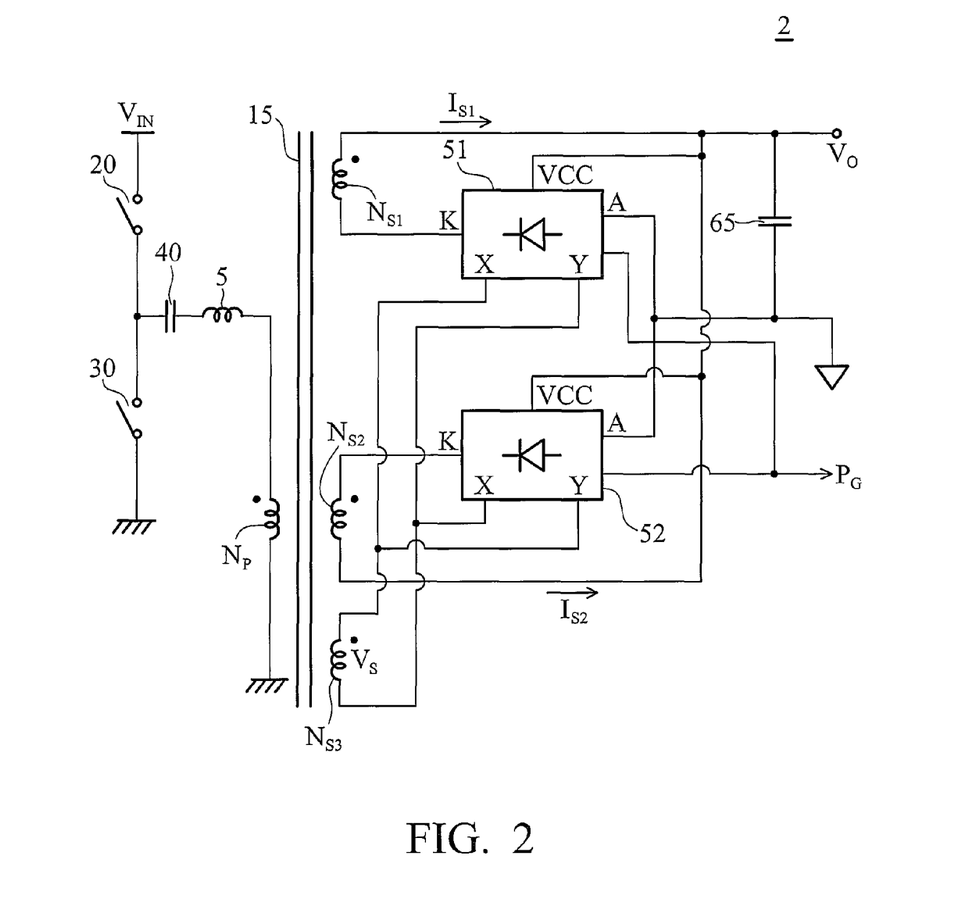
FIG. 2 shows a preferred embodiment of integrated synchronous rectifiers for a soft switching power converter according to the present invention.

FIG. 2 shows a soft switching power converter 2 with integrated synchronous rectifier (synchronous rectifying circuit) according to an embodiment of the invention. The power converter 2 includes a transformer 15 having a primary winding $N_P$, secondary windings $N_{S1}$, $N_{S2}$ and an auxiliary winding $N_{S3}$. The primary winding $N_P$ of the transformer 15 is coupled to two switches 20 and 30 which switch the primary winding $N_P$ of the transformer 15. Thus, the transformer 15 operates in a switching mode. Switches 20 and 30 develop a half bridge circuit to switch a resonant tank and the transformer 15. An inductor 5 and a capacitor 40 form the resonant tank. The transformer 15 transfers the energy from the primary winding $N_P$ to the secondary windings $N_{S1}$, $N_{S2}$ of the transformer 15. Integrated synchronous Rectifiers 51, 52 and a capacitor 65 rectify and filter voltages at the secondary windings $N_{S1}$, $N_{S2}$ to generate a DC voltage $V_O$ at the output of the power converter 2.

The integrated synchronous rectifier 51 has a cathode terminal K connected to the secondary winding $N_{S1}$. An anode terminal A of the integrated synchronous rectifier 51 is connected to the output ground of the power converter 2. An integrated synchronous rectifier 52 having the cathode terminal K and the anode terminal A is also connected from the secondary winding $N_{S2}$ to the output ground of the power converter 2. An input-signal terminal X, an input-signal terminal Y of the integrated synchronous rectifier 51 and the integrated synchronous rectifier 52 are connected to the auxiliary winding $N_{S3}$ to receive a switching signal $V_S$. The switching signal $V_S$ is used for controlling the integrated synchronous rectifiers 51 and 52.

The switching signal $V_S$ is generated in response to the switching of the transformer 15. The switching signal $V_S$ is correlated to switching currents $I_{S1}$ and $I_{S2}$ of the transformer 15. The auxiliary winding $N_{S3}$ thus generates the switching signal $V_S$ in response to the zero-crossings of the switching current $I_{S1}$ or $I_{S2}$. The switching signal $V_S$ is a differential signal. The polarity of the switching signal $V_S$ determines turning on or turning off of the integrated synchronous rectifiers 51 and 52. A power-good signal $P_G$ is generated by the integrated synchronous rectifiers 51 and 52. The power-good signal $P_G$ is disabled when the amplitude of the switching signal $V_S$ is lower than a threshold voltage or a supply voltage VCC at terminal VCC of the integrated synchronous rectifier 51 or 52 is lower than a VCC threshold.

Figure 3:
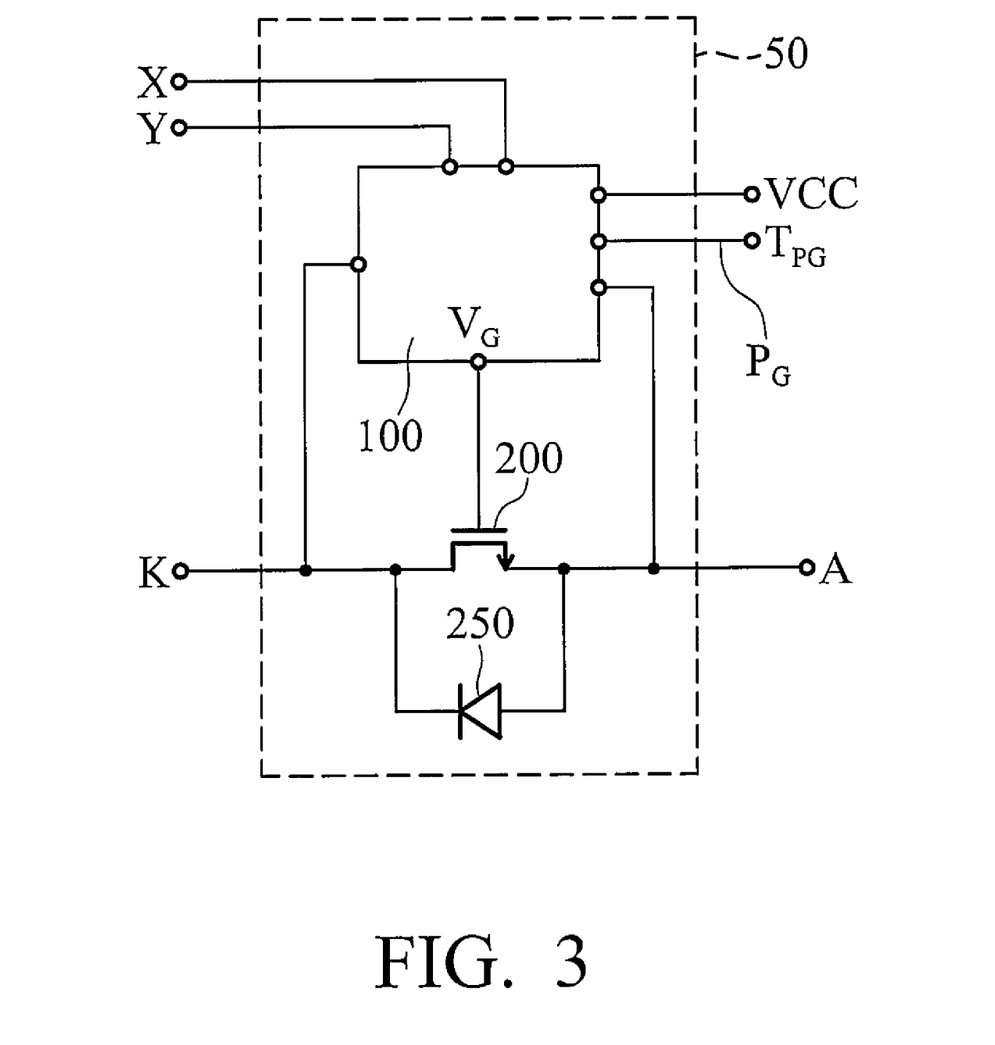
FIG. 3 is a schematic diagram of an integrated synchronous rectifier according to an embodiment of the present invention.

FIG. 3 is the schematic diagram of an integrated synchronous rectifier 50 showing an exemplary implementation of the integrated synchronous rectifier 51 or 52. The integrated synchronous rectifier 50 includes a power transistor 200, a diode 250 and a controller 100. The diode 250 is connected to the power transistor 200 in parallel, which is a Schottky diode or a parasitic device of the power transistor 200 for example. The power transistor 200 is connected between the cathode terminal K and the anode terminal A of the integrated synchronous rectifier 50. The cathode terminal K is coupled to the secondary winding ($N_{S1}$ or $N_{S2}$) of the transformer 15. The anode terminal A is coupled to the output ($V_O$) of the power converter 2. The controller 100 receives the switching signal $V_S$ via input-signal terminals X and Y for turning on or turning off the power transistor 200. A VCC terminal is utilized to supply the power source to the controller 200. A power-good terminal $T_{PG}$ outputs the power-good signal $P_G$ to show the operating status.

Figure 4:
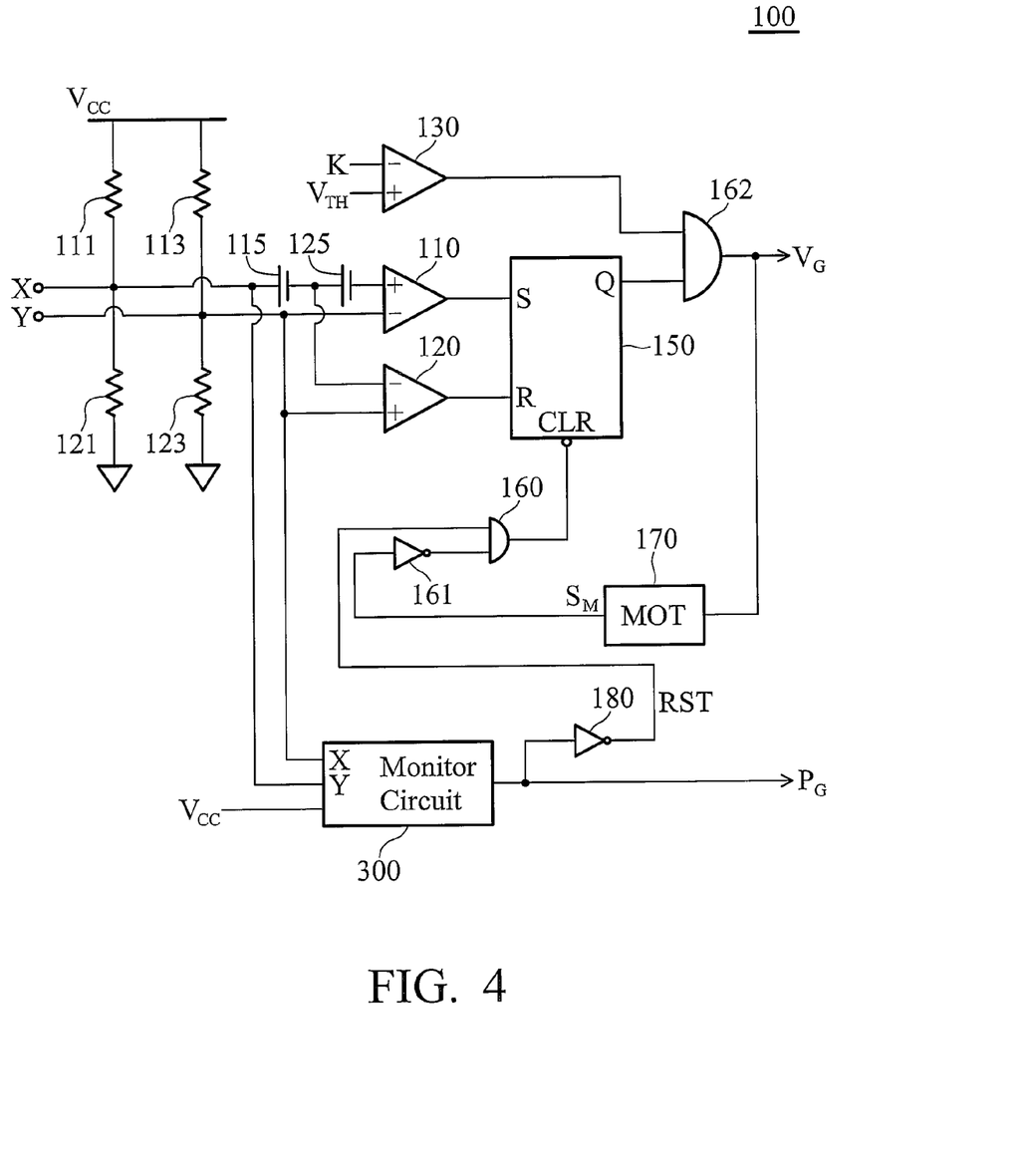
FIG. 4 is an embodiment of a controller of the integrated synchronous rectifier according to the present invention.

FIG. 4 shows a schematic diagram of a preferred embodiment of the controller 100. Resistors 111 and 121 provide a bias termination for the input-signal terminal X. Resistors 113 and 123 provide another bias termination for the input-signal terminal Y. The input-signal terminal X is coupled to the positive input of a comparator 110 through offset voltages 115 and 125. The offset voltages 115 and 125 are coupled in serial. The input-signal terminal X is also coupled to the negative input of a comparator 120 via the offset voltage 115. The input-signal terminal Y is connected to the positive input of the comparator 120 and the negative input of the comparator 110. The offset voltages 115 and 125 produce hysteresis. A third comparator 130 having a threshold $V_{TH}$ connects to its positive input. The negative input of the comparator 130 is coupled to the cathode terminal K. The output of comparators 110 is coupled to the set-input terminal ("S") of a SR flip-flop 150. The reset-input terminal ("R") of the SR flip-flop 150 is controlled by the output of the comparator 120. The output of the SR flip-flop 150 and the output of the comparator 130 are connected to an AND gate 162. A gate-drive signal $V_G$ is generated at the output of the AND gate 162 for controlling the power transistor 200 (shown in FIG. 3). The maximum on time of the gate-drive signal $V_G$ is limited by a maximum-on-time circuit (MOT) 170. The gate-drive signal $V_G$ is connected to the input of the maximum-on-time circuit 170. After a blanking time, a maximum-on-time signal $S_M$ will be produced in response to the enabling of the gate-drive signal $V_G$. The maximum-on-time signal $S_M$ is coupled to an AND gate 160 via an inverter 161. Another input of the AND gate 160 is coupled to received a reset signal RST. The output of the AND gate 160 is coupled to the clear terminal ("CLR") of the SR flip-flop 150 to clear the SR flip-flop 150. The maximum on time of the gate-drive signal $V_G$ is thus limited by the blanking time of the maximum-on-time circuit 170. The gate-drive signal $V_G$ will turn on the power transistor 200 when following equations (2) and (3) are met, $$V_X - V_Y > V_{115} + V_{125} \quad (2)$$

$$V_K < V_{TH} \quad (3)$$

The gate-drive signal $V_G$ will turn off the power transistor 200 when the switching signal $V_S$ is lower than the offset voltage 115, i.e., when $V_X - V_Y < V_{115}$. Where $V_X$ is the voltage of the input-signal terminal X; $V_Y$ is the voltage of the input-signal terminal Y; $V_K$ is the voltage of the cathode terminal K. $V_{TH}$ is the voltage of the threshold $V_{TH}$; $V_{115}$ is the value of the offset voltage 115; $V_{125}$ is the value of the offset voltage 125.

The voltage of the cathode terminal K will be lower than the voltage of the threshold $V_{TH}$ when the diode 250 is forward biased and conducted. Therefore, the power transistor 200 can only be turned on after the diode 250 is turned on, which achieves the soft-switching of the power transistor 200. Furthermore, the gate-drive signal $V_G$ will be disabled and the power transistor 200 will be turned off when the diode 250 is reversely biased (or when $V_K > V_{TH}$). A monitor circuit 300 is coupled to the terminals X, Y and VCC, and detects the switching signal $V_S$ and the supply voltage VCC for generating the power-good signal $P_G$. The reset signal RST is further produced by inverting the power-good signal $P_G$ via an inverter 180. The reset signal RST is coupled to turn off the power transistor 200, through the AND gate 160, the SR flip-flop 150 and the AND gate 162, when the monitor circuit 300 detects that the amplitude of the switching signal $V_S$ is lower than a predetermined threshold voltage or the supply voltage VCC is lower than a VCC threshold.

Figure 5:
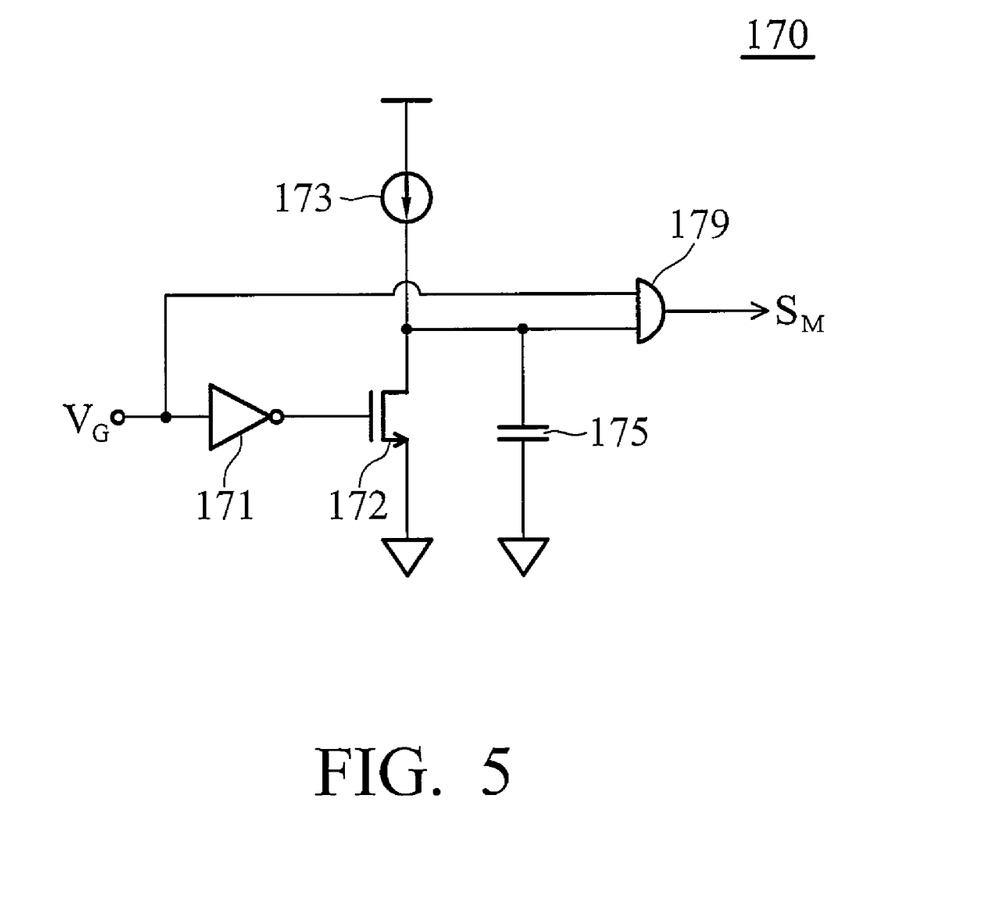
FIG. 5 is a maximum-on-time (MOT) circuit according to an embodiment of the present invention.

FIG. 5 is the maximum-on-time circuit (MOT) 170. A current source 173 is connected to charge a capacitor 175. A transistor 172 is connected to discharge the capacitor 175. The gate-drive signal $V_G$ is connected to control the transistor 172 through an inverter 171. The gate-drive signal $V_G$ is further connected to an AND gate 179. Another input of the AND gate 179 is coupled to the capacitor 175. When the gate-drive signal $V_G$ is enabled (for example, at a logic "1" or "high" state), the output of the AND gate 179 will generate the maximum-on-time signal $S_M$ to disable the gate-drive signal $V_G$ after the blanking time. The blanking time is determined by the current of the current source 173 and the capacitance of the capacitor 175.

Figure 6:
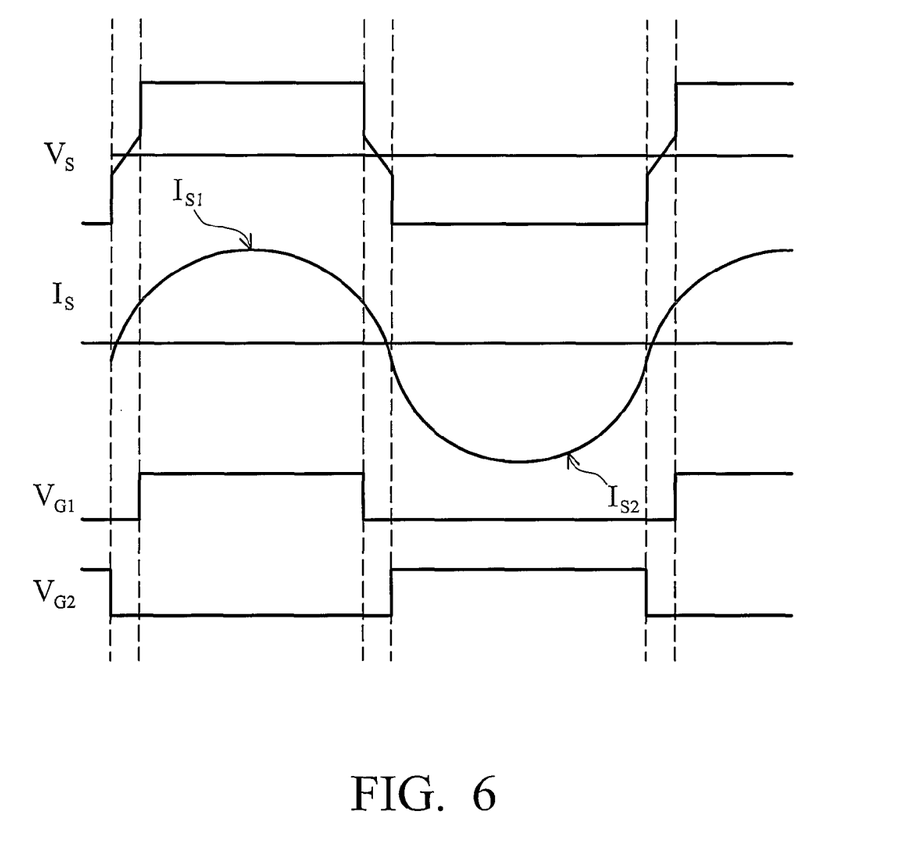
FIG. 6 shows key waveforms of the synchronous rectifying according to the present invention.

FIG. 6 shows key waveforms of the synchronous rectifying. The switching signal $V_S$ is generated in response to the zero-crossings of the switching current $I_S$ of the transformer 15 including $I_{S1}$ and $I_{S2}$. The gate-drive signals $V_{G1}$ and $V_{G2}$ are the gate-drive signal $V_G$ of the integrated synchronous rectifier 51 and the integrated synchronous rectifier 52 respectively.

Figure 7:
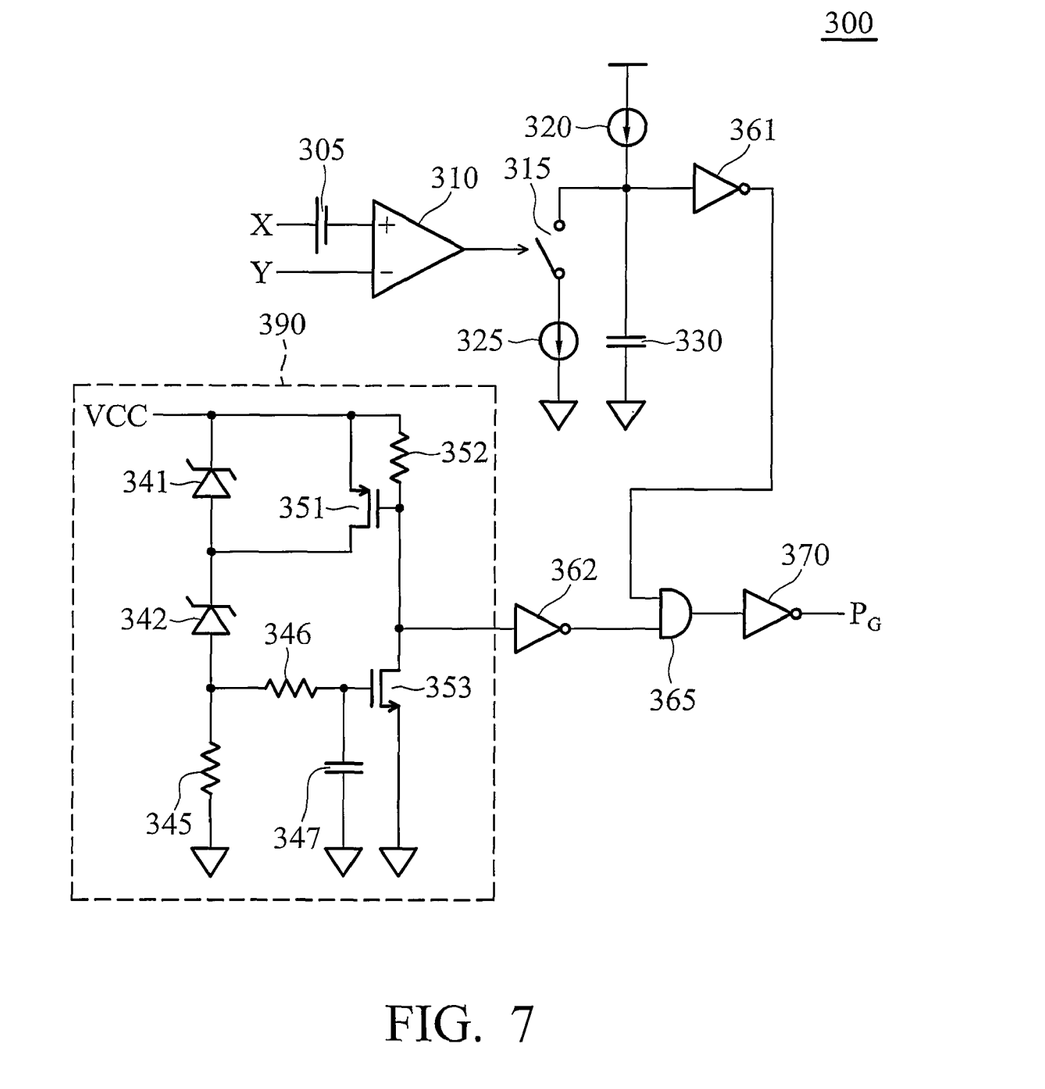
FIG. 7 is a preferred embodiment of a monitor circuit according to the present invention.

FIG. 7 shows a preferred embodiment of the monitor circuit 300. Current sources 320, 325 and a capacitor 330 form a debounce circuit. The current source 320 is applied to charge the capacitor 330. The current source 325 is coupled to discharge the capacitor 330 through a switch 315. The turning on/off of the switch 315 is controlled by a comparator 310. The positive input of the comparator 310 is coupled to the input-signal terminal X through the predetermined threshold voltage 305. The negative input of the comparator 310 is connected to the input-signal terminal Y to receive the switching signal $V_S$. Therefore, the switch 315 is turned off and the capacitor 330 is charged when the switching signal $V_S$ is smaller than the threshold voltage 305 (i.e., when $V_X - V_Y < V_{305}$). When a debounce period is reached, wherein the debounce period is determined by the current source 320 and the capacitance of the capacitor 330, the power-good signal $P_G$ will be disabled (logic "high"). An inverter 361 is connected to the capacitor 330. The output of the inverter 361 is connected to an AND gate 365. The output of the AND gate 365 generates the power-good signal $P_G$ via an inverter 370. Another input of the AND gate 365 is connected to a VCC-detection circuit 390 through an inverter 362. The VCC-detection circuit 390 is formed by transistors 351, 353, zener diodes 341, 342, resistors 352, 345, 346 and a capacitor 347. When VCC voltage is higher than the voltages of zener diodes 341 and 342, a signal on resistor 345 will turn on the transistor 353. The resistor 346 and the capacitor 347 are utilized to filter the noise of the signal on the resistor 345. The output of the transistor 353 is connected to the input of the inverter 362 and the transistor 351. The resistor 352 provides the bias for transistor 351. The transistor 351 operates to short-circuit the zener diode 341 when the transistor 353 is turned on. After short-circuiting the zener diode 341, the transistor 353 is subsequently turned off when the VCC voltage is lower than the voltage of zener diode 342. Therefore, the power-good signal $P_G$ will be disabled (logic high) when the amplitude of the switching signal $V_S$ is lower than the threshold voltage 305 or the VCC supply voltage is lower than the voltage of zener diode 342.

Figure 8:
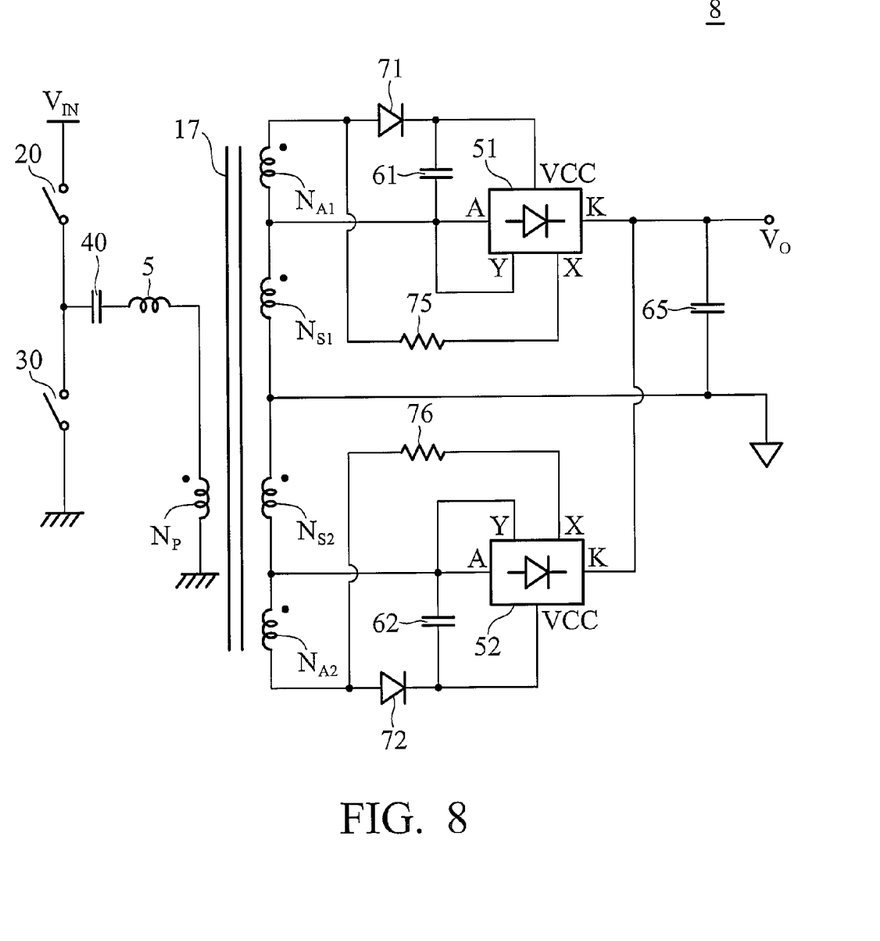
FIG. 8 shows another preferred embodiment of integrated synchronous rectifiers for soft switching power converter according to the present invention.

FIG. 8 shows a soft switching power converter 8 with integrated synchronous rectifier (synchronous rectifying circuit) according to another embodiment of the invention. It is noted that similar or same components or devices in FIG. 8 and FIG. 2 are indicated by the same notations or numerals and may not be described in detail for brevity. The transformer 17 provides an auxiliary winding $N_{A1}$ for generating a switching signal coupled to the integrated synchronous rectifier 51 through a resistor 75. The auxiliary winding $N_{A1}$ further generates a supply voltage (VCC) for the integrated synchronous rectifier 51 via a diode 71 and a capacitor 61. An auxiliary winding $N_{A2}$ of the transformer 17 generates another switching signal coupled to the integrated synchronous rectifier 52 through a resistor 76. Furthermore, the auxiliary winding $N_{A2}$ generates another supply voltage (VCC) for the integrated synchronous rectifier 52 via a diode 72 and a capacitor 62.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifying apparatus of soft switching power converter, comprising:
   an integrated synchronous rectifier, comprising:
      a power transistor and a diode coupled to a transformer and the output of the power converter for the rectifying;
      a controller generating a drive signal to control the power transistor in response to a switching signal;
   a transformer winding generating the switching signal in response to the switching of the transformer;
   wherein the controller comprises a monitor circuit for generating a power-good signal coupled to the transistor, and the monitor circuit comprises:
      a debounce circuit generating the power-good signal; and
      a comparator coupled to control the debounce circuit in response to the switching signal; and
   wherein the controller enables the drive signal to turn on the power transistor when the diode is forward biased; and disables the drive signal to turn off the power transistor when the diode is reversely biased; and
   wherein the power transistor is turned off when the switching signal is lower than a low-threshold, and is turned on when the switching signal is higher than a high-threshold whose level is higher than that of the low-threshold.

2. The synchronous rectifying apparatus as claimed in claim 1, wherein the controller further comprises:
   a maximum-on-time circuit generating a maximum-on-time signal coupled to the power transistor for controlling a maximum on time of the power transistor.

3. The synchronous rectifying apparatus as claimed in claim 1, wherein the controller comprises:
   a latch circuit generating the drive signal to control the power transistor;
   comparators generating a set signal and a reset signal coupled to the latch circuit for setting and resetting the latch circuit respectively;
   wherein the drive signal is enabled when the switching signal is higher than the high-threshold, and is disabled when the switching signal is lower than the low-threshold.

4. The synchronous rectifying apparatus as claimed in claim 1,
   wherein the power-good signal turns off the power transistor when the amplitude of the switching signal is lower than a threshold voltage or a supply voltage of the integrated synchronous rectifier is lower than a VCC threshold.

5. The synchronous rectifying apparatus as claimed in claim 1, wherein the diode is a parasitic device of the power transistor.

6. A synchronous rectifying circuit of a soft switching power converter, comprising:
   an integrated synchronous rectifier comprising:
      a power transistor coupled to a transformer and the output of the soft switching power converter for the rectifying;
      a controller generating a drive signal to control the power transistor in response to a switching signal
   a transformer winding generating the switching signal in response to the switching of the transformer;
   wherein the power transistor is turned off when the switching signal is lower than a low-threshold and is turned on when the switching signal is higher than a high-threshold whose level is higher than that of the low-threshold;
   wherein the controller comprises a monitor circuit for generating a power-good signal coupled to the transistor, and the power-good signal turns off the power transistor when a supply voltage of the integrated synchronous rectifier is lower than a VCC threshold; and
   wherein the monitor circuit comprises:
      a debounce circuit generating the power-good signal; and
      a comparator coupled to control the debounce circuit in response to the switching signal.

7. The synchronous rectifying circuit as claimed in claim 6, wherein the controller of the integrated synchronous rectifier further comprises:
   a maximum-on-time circuit generating a maximum-on-time signal;
   wherein the maximum-on-time signal is coupled to turn off the power transistor for limiting the maximum on time of the power transistor.

8. The synchronous rectifying circuit as claimed in claim 6, wherein the controller of the integrated synchronous rectifier comprises:
   a latch circuit generating the drive signal to control the power transistor;
   comparators generating a set signal and a reset signal coupled to the latch circuit for setting and resetting the latch circuit respectively;

wherein the drive signal is enabled when the switching signal is higher than the high-threshold and is disabled when the switching signal is lower than the low-threshold.

9. The synchronous rectifying circuit as claimed in claim 6, wherein the power-good signal turns off the power transistor when the amplitude of the switching signal is lower than a threshold voltage.

10. A method of synchronous rectifying for a soft switching power converter, comprising:
   generating a switching signal from a winding of a transformer;
   setting or resetting a latch in response to the switching signal;
   turning on or turning off a power transistor in accordance with a status of the latch;
   generating a maximum-on-time signal in response to the turning on of the power transistor; wherein the maximum-on-time signal is coupled to turn off the power transistor for limiting the maximum on time of the power transistor;
   comparing a level of the switch signal with a voltage threshold;
   determining whether a debounce period is reached, wherein the debounce period is determined by a current and a capacitance; and
   generating a power-good signal to turn off the power transistor when a supply voltage of the latch is lower than a VCC threshold or when the level of the switching signal is lower than the voltage threshold and the debounce period is reached;
   wherein the power transistor is coupled to the transformer and the output of the power converter for rectifying; the switching signal is generated in response to the switching of the transformer.

* * * * *